United States Patent
Morimoto et al.

(10) Patent No.: US 8,280,219 B2
(45) Date of Patent: Oct. 2, 2012

(54) APPARATUS, METHOD, AND PROGRAM FOR CONVERTING INFORMATION

(75) Inventors: Naoki Morimoto, Tokyo (JP); Kenichiro Aridome, Kanagawa (JP); Yukio Isobe, Kanagawa (JP); Atsushi Mae, Kanagawa (JP); Kenichiro Nagao, Tokyo (JP)

(73) Assignee: Sony Corporation, Tokyo (JP)

( * ) Notice: Subject to any disclaimer, the term of this patent is extended or adjusted under 35 U.S.C. 154(b) by 1098 days.

(21) Appl. No.: 12/182,514

(22) Filed: Jul. 30, 2008

(65) Prior Publication Data
US 2009/0052875 A1 Feb. 26, 2009

(30) Foreign Application Priority Data
Aug. 21, 2007 (JP) ................. 2007-214215

(51) Int. Cl.
*H04N 5/91* (2006.01)
(52) U.S. Cl. ..................... 386/131; 386/335
(58) Field of Classification Search .......... None
See application file for complete search history.

(56) References Cited

U.S. PATENT DOCUMENTS
7,860,821 B2 * 12/2010 Takakura et al. ............. 707/600

FOREIGN PATENT DOCUMENTS

| | | |
|---|---|---|
| JP | 2004-201100 | 7/2004 |
| JP | 2006-211324 | 8/2006 |
| JP | 2006-295531 | 10/2006 |
| JP | 2006-319397 | 11/2006 |
| JP | 3873952 | 11/2006 |
| WO | WO 2005/078727 A1 | 8/2005 |
| WO | WO2007105514 * | 5/2007 |
| WO | WO 2007/105514 A1 | 9/2007 |

* cited by examiner

*Primary Examiner* — Jeffrey Pwu
*Assistant Examiner* — Helai Salehi
(74) *Attorney, Agent, or Firm* — Oblon, Spivak, McClelland, Maier & Neustadt, L.L.P.

(57) ABSTRACT

An information converting apparatus includes an additional information retrieval unit for retrieving additional information incidental to moving image data stored on a stream file having a first recording format, an additional information converting unit for converting the retrieved additional information in accordance with a second recording format, and an additional information recording control unit for controlling recording of the converted additional information onto a stream file having the second recording format.

15 Claims, 27 Drawing Sheets

FIG. 2

| | HAVING NO DISPLAY STYLE DATA | DISPLAY-STYLE DRIVEN TEXT DATA | BIT MAP | VIDEO ENCODE |
|---|---|---|---|---|
| AVCHD | MODIFIED DV PACK | NOT APPLICABLE | OVERLAY BITMAP | ENABLED |
| DVD | EXTENDABLE | NOT APPLICABLE | SUB-PICTURE UNIT | ENABLED |
| BD | EXTENDABLE | TEXT SUBTITLE | PRESENTATION GRAPHICS | ENABLED |

FIG. 6

| SYNTAX | BIT LENGTH | REMARKS |
|---|---|---|
| user_data_unregistered(payloadSize) { | | |
|   uuid_iso_iec_11578 | 128 | UNIVERSALLY UNIQUE IDENTIFIER |
|   type_indicator | 32 | DATA TYPE |
|   if (type_indicator == 0x4741 3934) { | | |
|     cc_data() | | cc_data() STRUCTURE |
|   } else if (type_indicator == 0x4D44 504D) { | | |
|     ModifiedDVPackMeta() { | | ModifiedDVPackMeta() STRUCTURE |
|       number_of_modified_dv_pack_entries | 8 | NUMBER OF ENTRIES |
|       for (i=0;<br>        i<number_of_modified_dv_pack_entries;<br>        i++) { | | |
|         one_modified_dv_pack() { | | one_modified_dv_pack ()STRUCTURE |
|           mdp_id | 8 | MODIFIED DV PACK ID |
|           mdp_data | 32 | MODIFIED DV PACK DATA |
|         } | | |
|       } | | |
|     } | | |
|   } | | |
| } | | |

FIG. 7

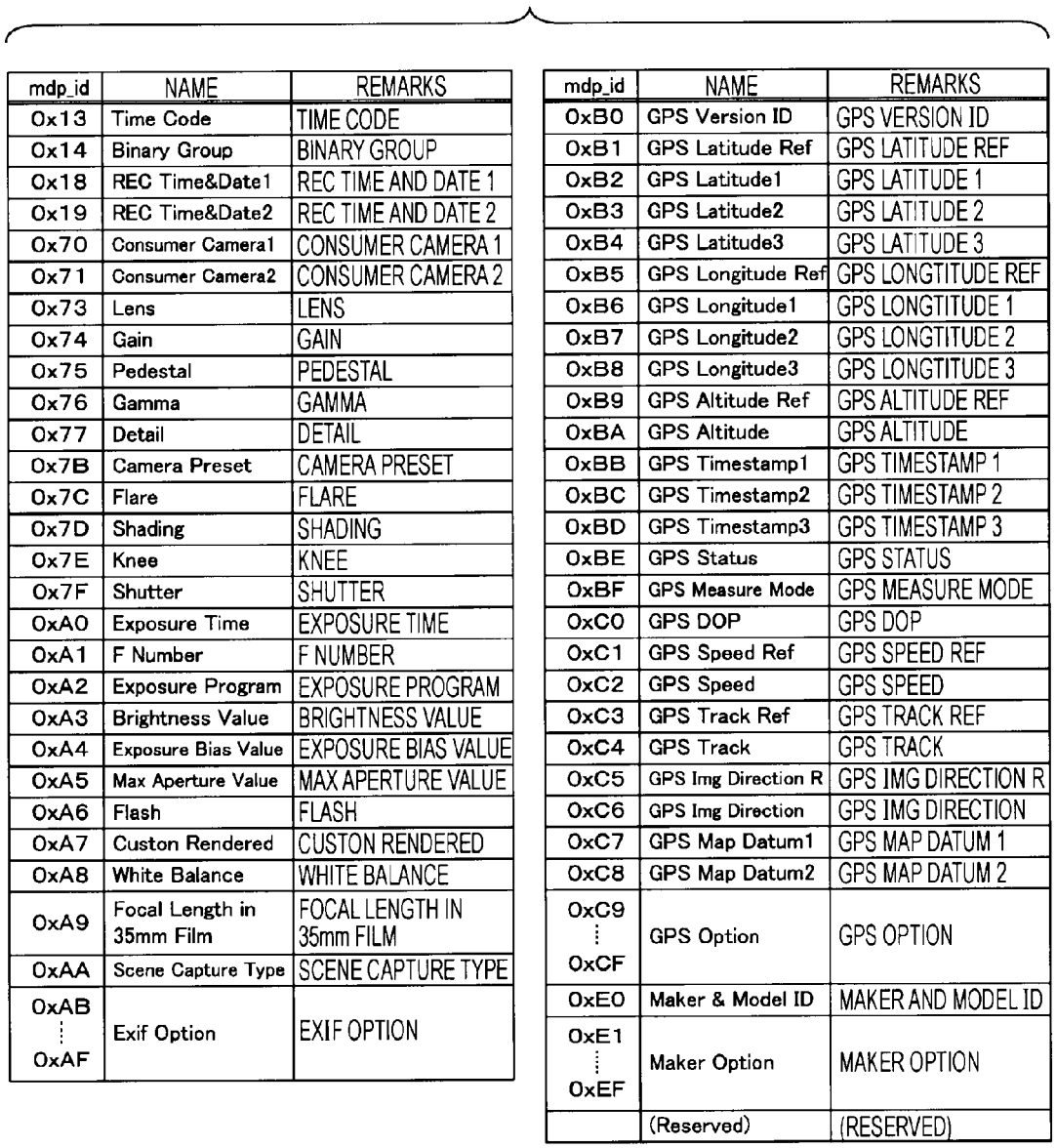

| mdp_id | NAME | REMARKS |
|---|---|---|
| 0x13 | Time Code | TIME CODE |
| 0x14 | Binary Group | BINARY GROUP |
| 0x18 | REC Time&Date1 | REC TIME AND DATE 1 |
| 0x19 | REC Time&Date2 | REC TIME AND DATE 2 |
| 0x70 | Consumer Camera1 | CONSUMER CAMERA 1 |
| 0x71 | Consumer Camera2 | CONSUMER CAMERA 2 |
| 0x73 | Lens | LENS |
| 0x74 | Gain | GAIN |
| 0x75 | Pedestal | PEDESTAL |
| 0x76 | Gamma | GAMMA |
| 0x77 | Detail | DETAIL |
| 0x7B | Camera Preset | CAMERA PRESET |
| 0x7C | Flare | FLARE |
| 0x7D | Shading | SHADING |
| 0x7E | Knee | KNEE |
| 0x7F | Shutter | SHUTTER |
| 0xA0 | Exposure Time | EXPOSURE TIME |
| 0xA1 | F Number | F NUMBER |
| 0xA2 | Exposure Program | EXPOSURE PROGRAM |
| 0xA3 | Brightness Value | BRIGHTNESS VALUE |
| 0xA4 | Exposure Bias Value | EXPOSURE BIAS VALUE |
| 0xA5 | Max Aperture Value | MAX APERTURE VALUE |
| 0xA6 | Flash | FLASH |
| 0xA7 | Custon Rendered | CUSTON RENDERED |
| 0xA8 | White Balance | WHITE BALANCE |
| 0xA9 | Focal Length in 35mm Film | FOCAL LENGTH IN 35mm FILM |
| 0xAA | Scene Capture Type | SCENE CAPTURE TYPE |
| 0xAB ⋮ 0xAF | Exif Option | EXIF OPTION |

| mdp_id | NAME | REMARKS |
|---|---|---|
| 0xB0 | GPS Version ID | GPS VERSION ID |
| 0xB1 | GPS Latitude Ref | GPS LATITUDE REF |
| 0xB2 | GPS Latitude1 | GPS LATITUDE 1 |
| 0xB3 | GPS Latitude2 | GPS LATITUDE 2 |
| 0xB4 | GPS Latitude3 | GPS LATITUDE 3 |
| 0xB5 | GPS Longitude Ref | GPS LONGTITUDE REF |
| 0xB6 | GPS Longitude1 | GPS LONGTITUDE 1 |
| 0xB7 | GPS Longitude2 | GPS LONGTITUDE 2 |
| 0xB8 | GPS Longitude3 | GPS LONGTITUDE 3 |
| 0xB9 | GPS Altitude Ref | GPS ALTITUDE REF |
| 0xBA | GPS Altitude | GPS ALTITUDE |
| 0xBB | GPS Timestamp1 | GPS TIMESTAMP 1 |
| 0xBC | GPS Timestamp2 | GPS TIMESTAMP 2 |
| 0xBD | GPS Timestamp3 | GPS TIMESTAMP 3 |
| 0xBE | GPS Status | GPS STATUS |
| 0xBF | GPS Measure Mode | GPS MEASURE MODE |
| 0xC0 | GPS DOP | GPS DOP |
| 0xC1 | GPS Speed Ref | GPS SPEED REF |
| 0xC2 | GPS Speed | GPS SPEED |
| 0xC3 | GPS Track Ref | GPS TRACK REF |
| 0xC4 | GPS Track | GPS TRACK |
| 0xC5 | GPS Img Direction R | GPS IMG DIRECTION R |
| 0xC6 | GPS Img Direction | GPS IMG DIRECTION |
| 0xC7 | GPS Map Datum1 | GPS MAP DATUM 1 |
| 0xC8 | GPS Map Datum2 | GPS MAP DATUM 2 |
| 0xC9 ⋮ 0xCF | GPS Option | GPS OPTION |
| 0xE0 | Maker & Model ID | MAKER AND MODEL ID |
| 0xE1 ⋮ 0xEF | Maker Option | MAKER OPTION |
|  | (Reserved) | (RESERVED) |

FIG. 8A

| SYNTAX | BIT LENGTH | REMARKS |
|---|---|---|
| REC TIME&DATE1 pack() { | | |
| mdp_id | 8 | MODIFIED DV PACK ID (= 0×18) |
| mdp_data { | | MODIFIED DV PACK DATA |
| blkTimeZone() | 8 | blkTimeZone () STRUCTURE |
| RecordTimeAndDate_1_of_2 | 24 | RecordTimeAndDate_1_of_2 STRUCTURE |
| } | | |
| } | | |

FIG. 8B

| SYNTAX | BIT LENGTH | REMARKS |
|---|---|---|
| REC TIME&DATE2 pack() { | | |
| mdp_id | 8 | MODIFIED DV PACK ID (= 0×19) |
| mdp_data { | | MODIFIED DV PACK DATA |
| RecordTimeAndDate_2_of_2 | 32 | RecordTimeAndDate_2_of_2 STRUCTURE |
| } | | |
| } | | |

FIG. 9

| SYNTAX | BIT LENGTH | REMARKS |
|---|---|---|
| blkTimeZone { | | |
| paddingBit | 1 | PADDING FIELD |
| DaylightSavingTimeFlag | 1 | DAYLIGHT SAVING TIME FLAG |
| TimeZoneSign | 1 | TIME ZONE SIGN |
| TimeZoneValue | 4 | TIME ZONE VALUE |
| HalfHourFlag | 1 | HALF-HOUR FLAG |
| } | | |

FIG. 10A
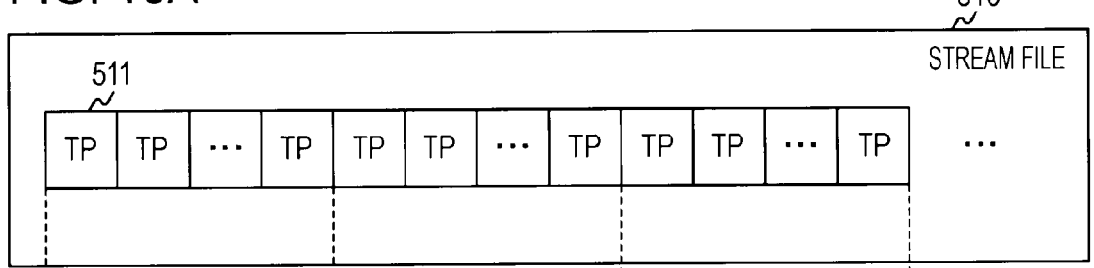
FIG. 10B
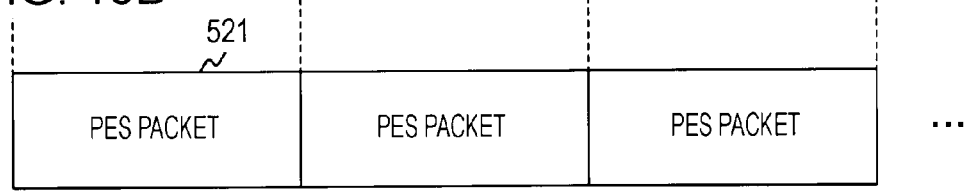
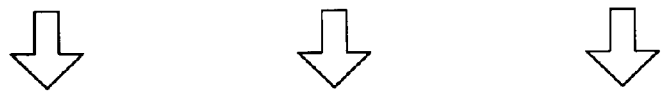
FIG. 10C
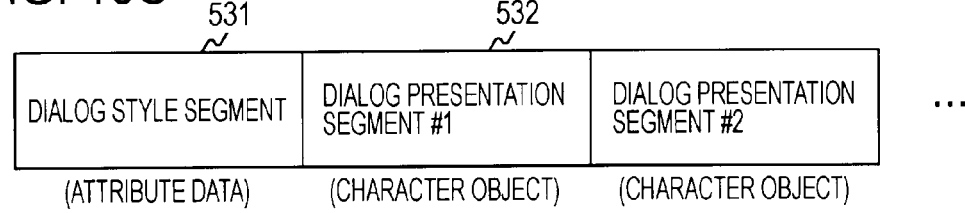

FIG. 11

| SYNTAX | BIT LENGTH | REMARKS |
|---|---|---|
| Text_subtitle_stream() { | | |
|   dialog_style_segment() | | dialog_style_segment () STRUCTURE |
|   number_of_dialog_presentation_segments | 16 | NUMBER OF SEGMENTS |
|   for (i=0; i<number_of_dialog_presentation_segments; i++) { | | |
|     dialog_presentation_segment() | | dialog_presentation_segment STRUCTURE |
|   } | | |
| } | | |

FIG. 12A

| SYNTAX | BIT LENGTH | REMARKS |
|---|---|---|
| segment() { | | |
| segment_descriptor() | | segment_description () STRUCTURE |
| segment_data() | | SEGMENT DATA |
| } | | |

FIG. 12B

| SYNTAX | BIT LENGTH | REMARKS |
|---|---|---|
| segment_descriptor() { | | |
| segment_type | 8 | SEGMENT TYPE |
| segment_length | 16 | SEGMENT LENGTH (NUMBER OF BYTES) |
| } | | |

FIG. 13

| SYNTAX | BIT LENGTH | REMARKS |
|---|---|---|
| dialog_style_set { | | |
|   player_style_flag | 1 | PLAYER STYLE FLAG |
|   reserved | 15 | RESERVED FIELD |
|   number_of_region_styles | 8 | NUMBER OF REGION STYLES |
|   number_of_user_styles | 8 | NUMBER OF USER STYLES |
|   for (i=0; i<number_of_region_styles; i++) { | | |
|     region_style() { | | region_style() STRUCTURE |
|       region_style_id | 8 | REGION STYLE IDENTIFIER |
|       region_info() { | | |
|         region_horizontal_position | 16 | REGION HORIZONTAL POSITION |
|         region_vertical_position | 16 | REGION VERTICAL POSITION |
|         region_width | 16 | REGION WIDTH |
|         region_height | 16 | REGION VERTICAL HEIGHT |
|         region_bg_palette_entry_id_ref | 8 | REGION BACKGROUND COLOR |
|         reserved | 8 | RESERVED FIELD |
|       } | | |
|       text_box_horizontal_position | 16 | TEXT BOX HORIZONTAL POSITION |
|       text_box_vertical_position | 16 | TEXT BOX VERTICAL POSITION |
|       text_box_width | 16 | TEXT BOX WIDTH |
|       text_box_height | 16 | TEXT BOX HEIGHT |
|       text_flow | 8 | TEXT FLOW |
|       text_horizontal_alignment | 8 | TEXT HORIZONTAL ALIGNMENT |
|       text_vertical_alignment | 8 | TEXT VERTICAL ALIGNMENT |
|       line_space | 8 | LINE SPACE |
|       font_id_ref | 8 | FONT IDENTIFIER |
|       font_style | 8 | FONT STYLE |
|       font_size | 8 | FONT SIZE |
|       font_palette_entry_id_ref | 8 | FONT COLOR |
|       outline_palette_entry_id_ref | 8 | OUTLINE COLOR |
|       outline_size | 8 | OUTLINE SIZE |
|     } | | |
|     user_changeble_style_set() | | user_changeable_style_set() STRUCTURE |
|   } | | |
|   palette() | | palette() STRUCTURE |
| } | | |

FIG. 15

| SYNTAX | BIT LENGTH | REMARKS |
|---|---|---|
| Movie PlayList file { | | |
|     TypeIndicator | 8 * 4 | FILE TYPE |
|     TypeIndicator2 | 8 * 4 | FILE VERSION |
|     PlayListStartAddress | 32 | PlayList () START ADDRESS |
|     PlayListMarkStartAddress | 32 | PlayListMark () START ADDRESS |
|     ExtensionDataStartAddress | 32 | ExtensionData () START ADDRESS |
|     reserved | 160 | RESERVED FIELD |
|     blkAppInfoPlayList() | | blkAppInfoPlayList() STRUCTURE |
|     for (i=0; i<N1; i++) { | | |
|         padding_word | 16 | PADDING FIELD |
|     } | | |
|     blkPlayList() | | blkPlayList () STRUCTURE |
|     for (i=0; i<N2; i++) { | | |
|         padding_word | 16 | PADDING FIELD |
|     } | | |
|     blkPlayListMark() | | blkPlayListMark () STRUCTURE |
|     for (i=0; i<N3; i++) { | | |
|         padding_word | 16 | PADDING FIELD |
|     } | | |
|     blkExtensionData() | | blkExtensionData () STRUCTURE |
|     for (i=0; i<N4; i++) { | | |
|         padding_word | 16 | PADDING FIELD |
|     } | | |
| } | | |

FIG. 16

| SYNTAX | BIT LENGTH | REMARKS |
|---|---|---|
| blkPlayListMarkExt() { | | |
|     Length | 32 | DATA LENGTH |
|     NumberOfPlayListMarks | 16 | NUMBER OF MARKS |
|     for (PL_mark_id=0;<br>        PL_mark_id<NumberOfPlayListMarks;<br>        PL_mark_id++) { | | |
|         blkMarkExtension() { | | blkMarkExtension () STRUCTURE |
|             MakerID | 16 | MAKER ID |
|             MakerModelCode | 16 | MAKER MODEL CODE |
|             reserved | 29 | RESERVED FIELD |
|             Pulldown | 2 | PULLDOWN |
|             MarkWriteProtectFlag | 1 | MARK WRITE PROTECT FLAG |
|             RefToMarkThumbnailIndex | 16 | THUMBNAIL REFERENCE |
|             blkTimeZone() | 8 | blkTimeZone () STRUCTURE |
|             RecordTimeAndDate | 4*14 | RECORD TIME AND DATE |
|         ⋮ | | |
|         } | | |
|     } | | |
| } | | |

FIG. 18A

| SYNTAX | BIT LENGTH | REMARKS |
|---|---|---|
| BitmapUnit() { | | |
| UnitDescriptor() | 24 | UnitDescriptor () STRUCTURE |
| UnitData() | | UnitData () STRUCTURE |
| } | | |

FIG. 18B

| SYNTAX | BIT LENGTH | REMARKS |
|---|---|---|
| UnitDescriptor() { | | |
| UnitType | 8 | UNIT TYPE |
| UnitLength | 16 | DATA LENGTH |
| } | | |

FIG. 19

| UNIT TYPE | UNIT NAME | REMARKS |
|---|---|---|
| 0x00–0x13 | (RESERVED) | |
| 0x14 | Palette Unit | COLOR OF EACH PIXEL, TRANSPARENCY INFORMATION TABLE, ETC. |
| 0x15 | Object Unit | BIT-MAP DATA BODY, POSITION AND SIZE INFORMATION, ETC. |
| 0x16 | Overlay Bitmap Compilation Unit | TYPE OF DISPLAY INFORMATION, ADDITIONAL INFORMATION OF OBJECT AND WINDOW, ETC. |
| 0x17 | Window Unit | INFORMATION RELATED TO WINDOW ON SCREEN |
| 0x18 | Menu Bitmap Compilation Unit | TYPE OF DISPLAY INFORMATION, ADDITIONAL INFORMATION OF OBJECT AND WINDOW, BUTTON INFORMATION, ETC. |
| 0x19–0x7F | (RESERVED) | |
| 0x80 | End Unit | ENDING INFORMATION OF DISPLAY UNIT |
| 0x81–0xFF | (RESERVED) | |

FIG. 20A

| SYNTAX | BIT LENGTH | REMARKS |
|---|---|---|
| ObjectUnit() { | | |
| UnitDescriptor() | 24 | UnitDescriptor () STRUCTURE |
| ObjectID | 16 | OBJECT ID |
| ObjectVersionNumber | 8 | OBJECT VERSION ID |
| SequenceDescriptor() | | SequenceDescriptor () STRUCTURE |
| ObjectData() | | ObjectData () STRUCTURE |
| } | | |

FIG. 20B

| SYNTAX | BIT LENGTH | REMARKS |
|---|---|---|
| ObjectData() { | | |
| ObjectDataLength | 24 | OBJECT DATA LENGTH |
| ObjectWidth | 16 | OBJECT WIDTH |
| ObjectHeight | 16 | OBJECT HEIGHT |
| while (process_lengh < ObjectDataLength) { | | |
| RunLengthEncodedLine() | | BIT-MAP DATA |
| } | | |
| } | | |

FIG. 21

| SYNTAX | BIT LENGTH | REMARKS |
|---|---|---|
| blkPlayItem() { | | |
|     Length | 16 | DATA LENGTH |
|     ClipInformationFileName | 8 * 5 | CLIP INFORMATION FILE NAME |
|     ClipCodecIdentifier | 8 * 4 | CLIP CODEC IDENTIFICATION |
|     reserved | 12 | RESERVED FIELD |
|     ConnectionCondition | 4 | CLIP CONNECTION CONDITION |
|     RefToSTCID | 8 | STC DISCONTINUITY POINT INFORMATION |
|     INTime | 32 | PLAY START POINT |
|     OUTTime | 32 | PLAY END POINT |
|     blkUOMaskTable() | | blkUOMaskTable () STRUCTURE |
|     PlayItemRandomAccessFlag | 1 | RANDOM ACCESS PERMISSION FLAG |
|     reserved | 7 | RESERVED FIELD |
|     StillMode | 8 | STILL IMAGE MODE |
|     if (StillMode == 0x01) { | | |
|         StillTime | 16 | STILL TIME |
|     } else { | | |
|         reserved | 16 | RESERVED FIELD |
|     } | | |
|     blkSTNTable() | 8 | blkSTNTable () STRUCTURE |
| } | | |

FIG. 22

| SYNTAX | BIT LENGTH | REMARKS |
|---|---|---|
| blkSTNTable() { | | |
|     Length | 16 | DATA LENGTH |
|     reserved | 17 | RESERVED FIELD |
|     NumberOfVideoStreamEntries | 8 | NUMBER OF VIDEO STREAM ENTRIES |
|     NumberOfAudioStreamEntries | 8 | NUMBER OF AUDIO STREAM ENTRIES |
|     NumberOfOBStreamEntries | 8 | NUMBER OF OB STREAM ENTRIES |
|     NumberOfMBStreamEntries | 8 | NUMBER OF MB STREAM ENTRIES |
|     reserved | 64 | RESERVED FIELD |
|     ⋮ | | |
|     for (OB_stream_id = 0;<br>        OB_stream_id < NumberOfOBStreamEntries;<br>        OB_stream_id++) { | | |
|         blkStreamEntry() | | blkStreamEntry () STRUCTURE |
|         blkStreamAttributes() | | blkStreamAttributes () STRUCTURE |
|     } | | |
|     ⋮ | | |
| } | | |

FIG. 23

| SYNTAX | BIT LENGTH | REMARKS |
|---|---|---|
| blkStreamEntry() { | | |
|     Length | 16 | DATA LENGTH |
|     Type | 16 | STREAM TYPE |
|     if (Type == 1) { | | |
|         RefToStreamPIDOfMainClip | 16 | PACKET ID OF MAIN CLIP |
|         reserved | 48 | RESERVED FIELD |
|     } else if (Type == 2) { | | |
|         RefToSubPathID | 8 | SUB PATH ID |
|         reserved | 8 | RESERVED FIELD |
|         RefToStreamPIDOfSubClip | 16 | PACKET ID OF SUB CLIP |
|         reserved | 32 | RESERVED FIELD |
|     } | | |
| } | | |

FIG. 24

| SYNTAX | BIT LENGTH | REMARKS |
|---|---|---|
| blkStreamAttributes() { | | |
|     Length | 8 | DATA LENGTH |
|     StreamCodingType | 8 | STREAM TYPE |
|     if (StreamCodingType == 0x1B) { | | |
| ⋮ | | |
|     } else if (StreamCodingType == 0x90) { | | OVERLAY BIT-MAP STREAM |
|         OBLanguageCode | 8 * 3 | LANGUAGE CODE |
|         reserved | 8 | RESERVED FIELD |
|     } else if (StreamCodingType == 0x91) { | | |
| ⋮ | | |
|     } | | |
| } | | |

FIG. 25

| SYNTAX | BIT LENGTH | REMARKS |
|---|---|---|
| Clip information file { | | |
|     Typeindicator | 8 * 4 | FILE TYPE |
|     Typeindicator2 | 8 * 4 | FILE VERSION |
|     SequenceInfoStartAdress | 32 | SequenceInfo () START ADDRESS |
|     ProgramInfoStartAdress | 32 | ProgramInfo () START ADDRESS |
|     CPIStartAdress | 32 | CPI () START ADDRESS |
|     ClipMarkStartAdress | 32 | ClipMark () START ADDRESS |
|     ExtensionDataStartAdress | 32 | ExtensionData () START ADDRESS |
|     reserved | 96 | RESERVED FIELD |
|     blkClipInfo() | | blkClipInfo () STRUCTURE |
|     for (i=0; i<N1; i++) { | | |
|         padding_word | 16 | PADDING FIELD |
|     } | | |
|     blkSequenceInfo() | | blkSequenceInfo () STRUCTURE |
|     for (i=0; i<N2; i++) { | | |
|         padding_word | 16 | PADDING FIELD |
|     } | | |
|     blkProgramInfo() | | blkProgramInfo () STRUCTURE |
|     for (i=0; i<N3; i++) { | | |
|         padding_word | 16 | PADDING FIELD |
|     } | | |
|     blkCPI() | | blkCPI () STRUCTURE |
|     for (i=0; i<N4; i++) { | | |
|         padding_word | 16 | PADDING FIELD |
|     } | | |
|     blkClipMark() | | blkClipMark () STRUCTURE |
|     for (i=0; i<N5; i++) { | | |
|         padding_word | 16 | PADDING FIELD |
|     } | | |
|     blkExtensionData() | | blkExtensionData () STRUCTURE |
|     for (i=0; i<N6; i++) { | | |
|         padding_word | 16 | PADDING FIELD |
|     } | | |
| } | | |

FIG. 26

| SYNTAX | BIT LENGTH | REMARKS |
|---|---|---|
| blkStreamCodingInfo(stream_index) { | | |
| Length | 8 | DATA LENGTH |
| StreamCodingType | 8 | STREAM TYPE |
| if (StreamCodingType == 0x1B) { | | |
| ... | | |
| } else if (StreamCodingType == 0x90) { | | OVERLAY BIT-MAP STREAM |
| OBLanguageCode | 8 * 3 | LANGUAGE CODE |
| reserved | 136 | RESERVED FIELD |
| } else if (StreamCodingType == 0x91) { | | |
| ... | | |
| } | | |
| } | | |

APPARATUS, METHOD, AND PROGRAM FOR CONVERTING INFORMATION

CROSS REFERENCES TO RELATED APPLICATIONS

The present invention contains subject matter related to Japanese Patent Application JP 2007-214215 filed in the Japanese Patent Office on Aug. 21, 2007, the entire contents of which are incorporated herein by reference.

BACKGROUND OF THE INVENTION

1. Field of the Invention

The present invention relates to an information converting apparatus and, in particular, to an information converting apparatus, an information converting method, and a computer program for converting additional information incidental to moving image data.

2. Description of the Related Art

Digital still cameras for capturing a still image can record, in the form of metadata, additional information such as camera information including image recording time and date. Digital still cameras recording the additional information of still image data in accordance with Exchangeable Image File Format (Exif) standard (standardized by Japan Electronic Industry Development Association (JEIDA)) are in widespread use (as disclosed in Japanese Unexamined Patent Application Publication No. 2006-211324). Some camcorders (camera and recorders) record additional information of moving image data (video data and audio data). For example, Japanese Patent No. 3873952 discloses an information recording apparatus that records additional recording information (ARI-PCK) on a digital versatile disk (DVD).

SUMMARY OF THE INVENTION

The AVCHD Standard has been proposed. The proposed AVCHD standard is intended to record and play digital high-definition video higher in resolution than ever. In accordance with the AVCHD standard, additional information is recorded onto a stream file referred to as a modified digital video pack (MDP).

The AVCHD standard does not need display of additional information contained in the MDP on a reproducing apparatus. The additional information recorded on the MDP may not be displayed on some of the reproducing apparatuses complying with the AVCHD standard. The additional information may entirely be missing if the additional information is copied from a recording medium complying with the AVCHD standard to a recording medium complying with another standard.

It is thus desirable to convert in the moving image data the additional information, the displaying of which is not necessary in the AVCHD standard, into a state usable on a different reproducing apparatus.

In accordance with one embodiment of the present invention, an information converting apparatus includes additional information retrieval means for retrieving additional information incidental to moving image data stored on a stream file having a first recording format, additional information converting means for converting the retrieved additional information in accordance with a second recording format, and additional information recording control means for controlling recording of the converted additional information onto a stream file having the second recording format. The present invention also relates to a method of the information converting apparatus and a computer program for causing a computer to perform the method of the information converting apparatus. With this arrangement, the additional information of the moving image data recorded on the stream file having the first recording format is converted and recoded onto the stream file having the second recording format.

The additional information may include image recording time and date of the moving image data.

The additional information in the first recording format may include data having no display style. The additional information in the first recording format may include information that is recorded as a modified digital video pack defined by the AVCHD standard. The additional information in the first recording format may include image recording time and date information attached to a chapter mark, or time and date information on a file system of a stream file of audio-visual data.

The information converting apparatus may further include display style specifying means for specifying a display style of the additional information in the second recording format. With this arrangement, the additional information is recorded in the specified display style. The additional information in the second recording format may include text data arranged in the display style specified by the display style specifying means. The additional information in the second recording format may include information recorded as a text subtitle in accordance with the Blu-ray disk standard. The additional information in the second recording format may include bitmap data arranged in the display style specified by the display style specifying means. For example, the additional information in the second recording format may be a subpicture unit on a digital versatile disk (DVD) or presentation graphics in accordance with the Blu-ray disk standard. The additional information in the second recording format may be the one overlaid on video data in accordance with re-encoding.

In accordance with one embodiment of the present invention, an information converting apparatus, includes additional information retrieval means for retrieving first additional information of moving image data recorded on a stream file, additional information converting means for converting the retrieved first additional information into second additional information, and additional information recording control means for controlling recording of the converted second additional information in the same format as the stream file. The present invention also relates to a method of the information converting apparatus and a computer program of the method of the information converting apparatus. The first additional information of the moving image data recorded on the stream file is thus recorded as the second additional information on the stream file having the same recording format.

The information converting apparatus may further include display style specifying means for specifying a display style of the second additional information. With this arrangement, the additional information is recorded in accordance with the specified display style. The first additional information may include data having no display style. The first additional information may include information recorded as a modified digital video pack defined by the AVCHD standard. The first additional information may include image recording time and date information attached to a chapter mark, or time and date information on a file system of a stream file of audio visual data. The second additional information may include bitmap data arranged in the display style specified by the display style specifying means. The second additional information may include information recorded as an overlay bitmap defined by the AVCHD standard. The additional information in the second recording format may be the one overlaid on video data by re-encoding.

In accordance with embodiments of the present invention, the additional information of the moving image data, the displaying of which is not necessary in the AVCHD standard, is thus converted into a state usable on a different reproducing apparatus.

BRIEF DESCRIPTION OF THE DRAWINGS

FIG. 2 is a table listing a relationship between a style of recording of additional information and a recording format of the additional information;

FIG. 6 illustrates a general structure of data of a modified digital video pack (MDP) of the AVCHD standard;

FIG. 7 illustrates correspondence between the ID (identification) of the MDP and the additional information in accordance with the AVCHD standard;

FIGS. 8A and 8B illustrate a data structure of the MDP representing image recording time and date in accordance with the AVCHD standard;

FIG. 9 illustrates a data structure of a time zone in accordance with the AVCHD standard;

FIGS. 10A-10C illustrate a structure of a stream file containing a text subtitle in accordance with Blu-ray disk (BD) standard;

FIG. 11 illustrates a data structure of a text subtitle stream in accordance with the BD standard;

FIGS. 12A and 12B illustrate a data structure of a segment in accordance with the BD standard;

FIG. 13 illustrates a data structure of a dialog style set in accordance with the BD standard;

FIG. 15 illustrates a data structure illustrating a playlist file in accordance with the AVCHD standard;

FIG. 16 illustrates a data structure of a block "blkPlayList-MarkExt( )" in accordance with the AVCHD standard;

FIGS. 18A and 18B illustrate a data structure of a bitmap unit contained in an overlay bit map in accordance with the AVCHD standard;

FIG. 19 illustrates a type of the bit map unit in accordance with the AVCHD standard;

FIGS. 20A and 20B illustrate a data structure of an "object unit" in accordance with the AVCHD standard;

FIG. 21 illustrates a data structure of a block "blkPlayItem( )" in accordance with the AVCHD standard;

FIG. 22 illustrates a data structure of a block "blkSTNTable( )" in accordance with the AVCHD standard;

FIG. 23 illustrates a data structure of a block "blkStreamEntry( )" in accordance with the AVCHD standard;

FIG. 24 illustrates a data structure of a block "blkStreamAttributes( )" in accordance with the AVCHD standard;

FIG. 25 illustrates a data structure of a clip information file in accordance with the AVCHD standard;

FIG. 26 illustrates a data structure of a block "blkStreamCodingInfo( )" in accordance with the AVCHD standard.

DESCRIPTION OF THE PREFERRED EMBODIMENTS

The embodiments of the present invention are described below with reference to the drawings.

Figure 1:
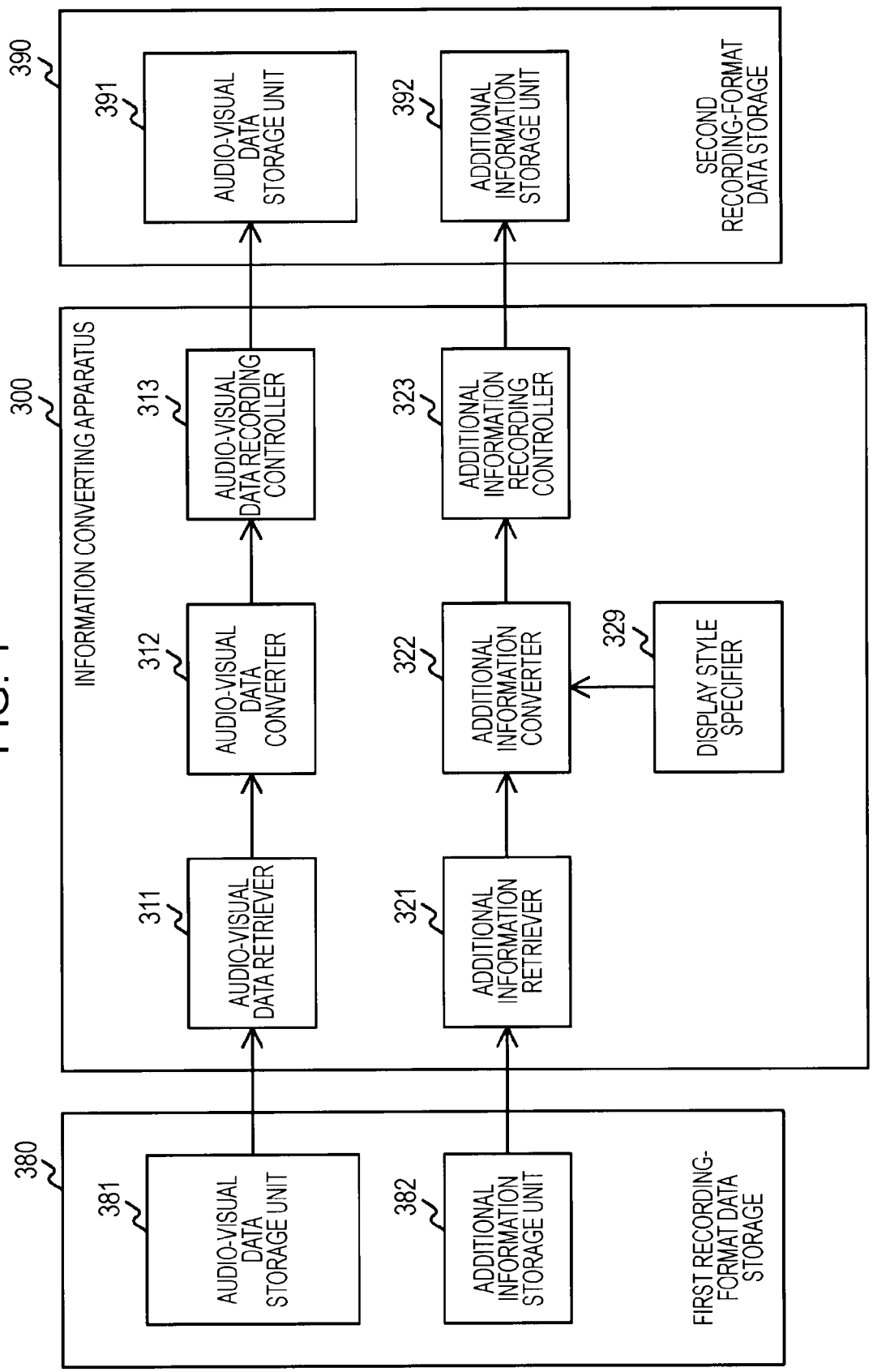
FIG. 1 illustrates an information converting apparatus in a first configuration thereof in accordance with one embodiment of the present invention.

FIG. 1 illustrates an information converting apparatus 300 in a first configuration thereof in accordance with one embodiment of the present invention. The information converting apparatus 300 in the first configuration thereof converts audio-visual data (moving image data) and additional information, recorded on a first audio-visual recording-format data storage 380, and records the converted data onto a second recording-format data storage 390. The first audio-visual recording-format data storage 380 includes an audio-visual data storage unit 381 that records thereon the audio-visual data in a first recording format and an additional information storage unit 382 that records thereon the additional information in the same format. The second recording-format data storage 390 includes an audio-visual data storage unit 391 that records thereon the audio-visual data in a second recording format and an additional information storage unit 392 that records the additional information in the same format.

The information converting apparatus 300 in the first configuration thereof includes an audio-visual data retriever 311, an audio-visual data converter 312, an audio-visual data recording controller 313, an additional information retriever 321, an additional information converter 322, an additional information recording controller 323, and a display style specifier 329.

The audio-visual data retriever 311 retrieves the audio-visual data from the audio-visual data storage unit 381. The retrieved audio-visual data is then supplied to the audio-visual data converter 312.

The audio-visual data converter 312 converts the audio-visual data supplied from the audio-visual data retriever 311 from the first recording format to the second recording format. The format converted audio-visual data is then supplied to the audio-visual data recording controller 313.

The audio-visual data recording controller 313 controls recording of the audio-visual data supplied from the audio-visual data converter 312 onto the audio-visual data storage unit 391. The audio-visual data in the second recording format is thus recorded onto the audio-visual data storage unit 391.

The additional information retriever 321 retrieves the additional information from the additional information storage unit 382. The retrieved audio-visual data is supplied to the additional information converter 322.

The additional information converter 322 converts the additional information supplied from the additional information retriever 321 from the first recording format to the second recording format. The format converted data is supplied to the additional information recording controller 323.

The additional information recording controller 323 controls recording of the additional information supplied from the additional information converter 322 on the additional information storage unit 392. The additional information in the second recording format is thus recorded onto the additional information storage unit 392.

The display style specifier 329 specifies a display style of the additional information in the second recording format. The additional information converter 322 thus converts the additional information in accordance with the display style specified by the display style specifier 329. The display style specifier 329 may be a unit that stores fixed data onto a read-only memory (ROM) or the like, or may be a user interface that receives a user operation input.

FIG. 2 illustrates a relationship between a style of storing the additional information and a recording format. Recording formats of moving image data include an AVCHD format, a DVD format, and a Blu-ray disc (BD) format. The styles of storing the additional information include data having no display style, display-style driven data, bitmap data, and video encode data.

A display style specified onto the text data may include attributes such as a font type, size, style (italic, bold, etc.), outline, and line space.

In accordance with the AVCHD standard, the data having no display style may be stored as a modified digital video pack (MDP). The DVD and BD formats do not define any particular data having no display style. But such data can be stored by expanding privately the respective standards.

The AVCHD and DVD standards define no function to store display-style driven text data. The BD standard allows the display-style driven text data to be stored as a text subtitle.

Each character is stored as a character code thereof in the case of text data and each character is stored as a bit pattern in the case of a bit map. Also, each character is can be stored as an overlay bitmap (OB) or a menu bitmap (BM) in accordance with the AVCHD standard, as a sub-picture unit (SPU) in accordance with the DVD standard, or as presentation graphics or interactive graphics in accordance with the BD standard.

A video encoding style for superimposing a bitmap onto a video is used in each of the AVCHD, DVD and BD standards by performing a re-encoding process. However, since the bitmap that is superimposed onto the video through the re-encoding process is integrated with the video, it is difficult to separate the bitmap from the video again.

In accordance with one embodiment of the present invention, the first recording format is set to be the AVCHD standard and the second recording format is set to be one of the DVD and the BD standards. The AVCHD format is described below.

Figure 3:
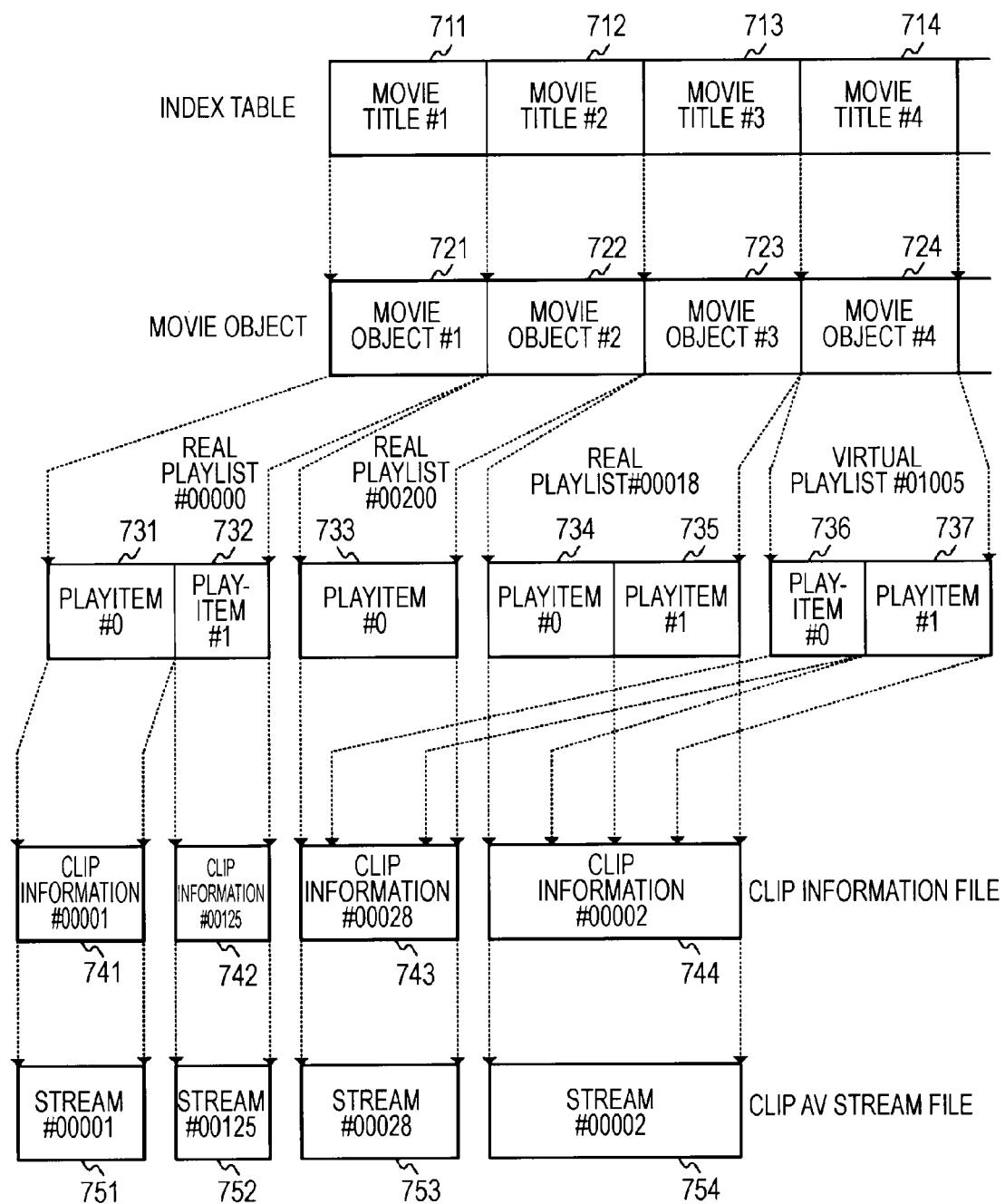
FIG. 3 illustrates a data structure of the AVCHD standard.

FIG. 3 illustrates a data structure in accordance with the AVCHD standard. The AVCHD standard handles the AV data (audio-visual data) in a layer structure. The layer structure of the AVCHD standard is mainly composed of an index table, a movie object, a playlist, a clip information file, and a clip AV stream file.

The clip AV stream file is a bit stream that is produced by multiplexing video data (image data) and audio data through an MPEG 2 transport stream (TS) format. Multiplexed into the clip AV stream file are an overlay bitmap (OB) stream as a graphic stream for displaying a subtitle, and a menu bitmap (MB) stream as a stream of data for use in menu displaying (button image data).

The clip information file stores, as clip information, information related to the clip AV stream file. The clip information file contains a mapping (conversion) table or the like, mapping a time position to a space position (address) in the clip AV stream file. If an access point in the clip AV stream file is specified by time, an appropriate address on the clip AV stream file is accessed by referencing the mapping table.

The clip AV stream file and the clip information file storing the clip information corresponding thereto are collectively referred to as a clip. The clip AV stream file and the clip information file, forming the clip, are related to each other on a one-to-one correspondence basis. As shown in FIG. 3, clip information 741 stores information related to a stream 751, clip information 742 stores information related to a stream 752, clip information 743 stores information related to a stream 753, and clip information 744 stores information related to a stream 754.

The play list (PlayList) contains a clip to be played and information related to a play start point and a play end point of the clip. The information related to the play start point and the play end point is referred to as a play item (PlayItem). One PlayList contains at least on play item. The playing of the clip is performed through the play list. More specifically, the play items contained in the play list are successively played by playing the play list. A period corresponding to each clip is thus played in accordance with the play start point and the play end point in the play item.

A play list mark is attached to each play item. The play item is segmented into a plurality of chapters by the play list marks. Conversely, a plurality of PlayItems may be contained in a single chapter.

The PlayLists include a real PlayList and a virtual PlayList. The real PlayList stores at least one clips basically in the order of recording. No time gap is present within one real PlayList and no overlap takes place between real PlayLists. The virtual PlayList stores part or whole of clips of any number equal to or larger than one corresponding to the real PlayList. As shown in FIG. 3, the PlayItems 731, 732, 733, 734, and 735 belong to the real PlayList, and PlayItems 736 and 737 belong to the virtual PlayList.

The MovieObject contains a navigation command program and the like. The navigation command program is a group of commands for controlling the playing of the PlayList and a process subsequent to the playing. As shown in FIG. 3, the MovieObject#1 (721) is to play a real PlayList #00000, a (722) is to play a real PlayList #00200, a (723) is to play a real PlayList #00018, and a (724) is to play a virtual PlayList #01005.

The index table is the highest table defining a title of a content recorded on a recording medium. The index table contains at least one movie title and each movie title points to a MovieObject. As shown in FIG. 3, a movie title #1 (711) points to the MovieObject #1 (721), a movie title #2 (712) points to the MovieObject #2 (722), a movie title #3 (713) points to the MovieObject #3 (723), and a movie title #4 (714) points to the MovieObject #4 (724). A player apparatus controls playing of the content based on the title information stored in the index table.

Figure 4:
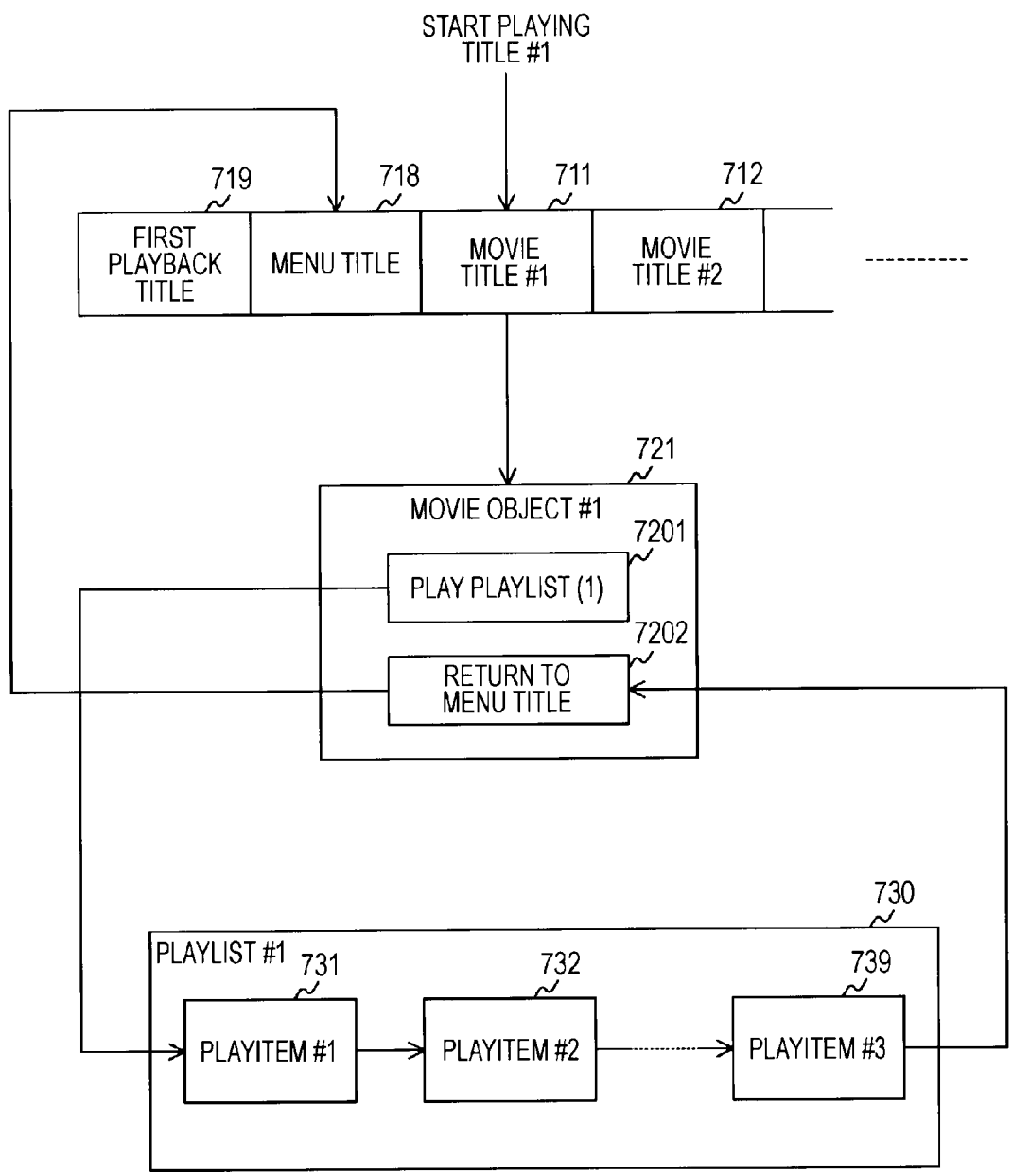
FIG. 4 illustrates a movie object and the position thereof with respect to the AVCHD standard.

FIG. 4 illustrates a MovieObject and other objects surrounding the MovieObject in the AVCHD standard. In addition to the movie title, the index table contains a first playback title 719 and a menu title 718. The first playback title 719 points to a MovieObject of a title to be played first. The menu title 718 points to a MovieObject corresponding to a menu screen.

The start of playing title #1 may be instructed now. The movie title #1 (711) points to the movie object #1 (721), and a navigation command program contained in the movie object #1 (721) is thus executed.

When a command 7201 to play a PlayList #1 (730) is executed in the MovieObject #1 (721), the PlayItems in the PlayList #1 (730) are successively performed. The corresponding clip is performed via the PlayList #1 (730). As shown in FIG. 4, a PlayItem #1 (731), a PlayItem #2 (732), . . . are played in that order. When the playing of a PlayItem #9 (739) is completed, processing returns to the MovieObject #1 (721).

Processing returns to the menu title in response to the navigation program command in the MovieObject #1 (721) (7202). Control is thus transferred to the menu title 718.

Figure 5:
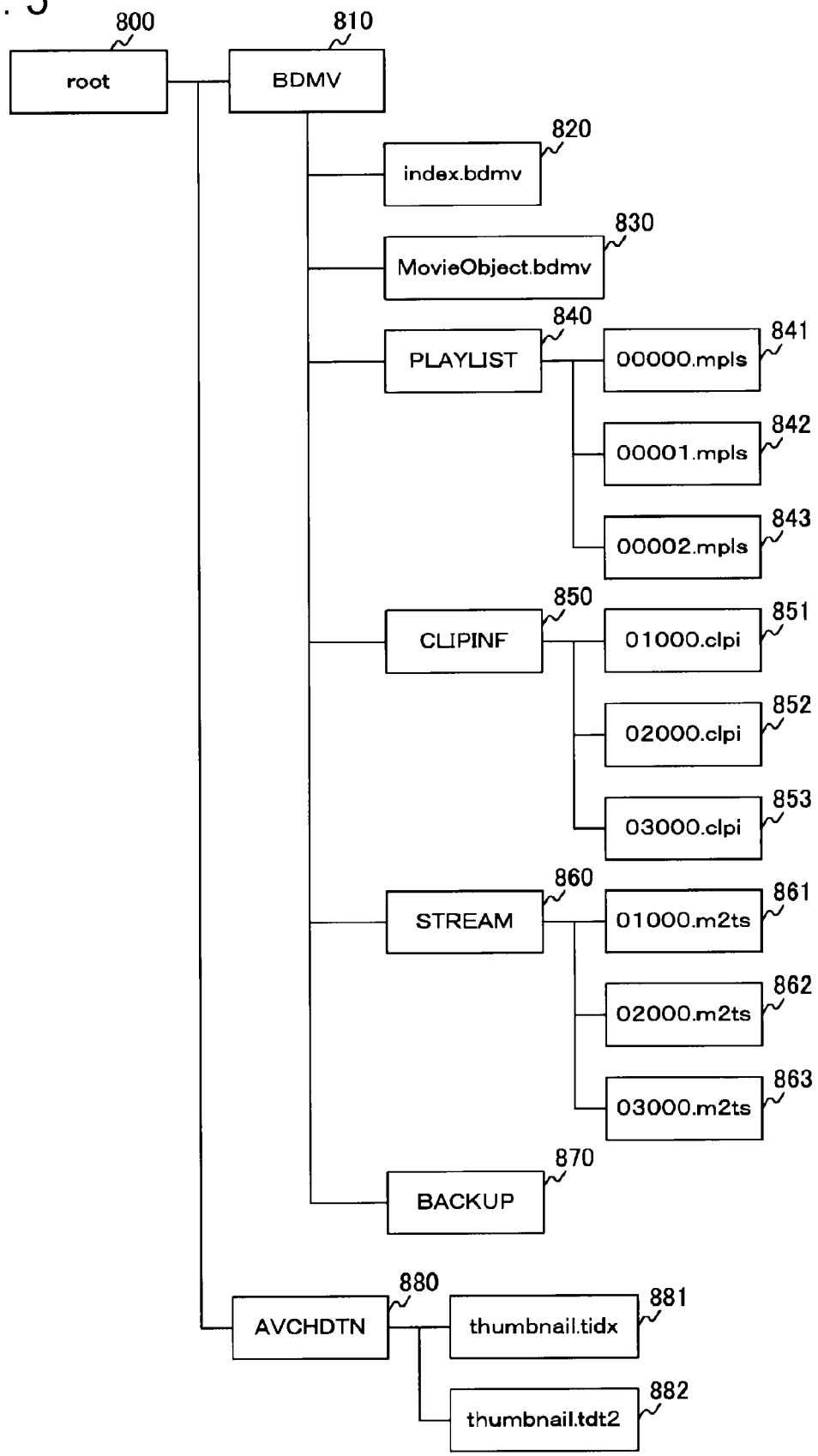
FIG. 5 illustrates a file structure of the AVCHD standard.

FIG. 5 illustrates a file structure of the AVCHD standard. A directory "BDMV" 810 containing contents of the clip is arranged under a root directory 800 of the recording medium. As necessary, a directory "AVCHDTN" 880 containing thumbnails is arranged under the root directory.

A file index.bdmv 820 and a file "MovieObject.bdmv" 830 are arranged directly under the directory BDMV 810. Also arranged under the directory BDMV 810 are a directory "PLAYLIST" 840, a directory "CLIPINF" 850, a directory "STREAM" 860, and a directory "BACKUP" 870.

The file index.bdmv 820, storing the content of the directory BDMV 810, corresponds to the index table discussed with reference to FIG. 3. The file MovieObject.bdmv 830, storing information regarding the MovieObject, corresponds to the MovieObject discussed with reference to FIG. 3.

The directory PLAYLIST 840 has the database of the PlayList. The directory PLAYLIST 840 contains files 841 through 843 related to the PlayList. A file name of each file in the directory PLAYLIST 840 contains a five-digit number and an extension. Out of the five-digit numbers, 1000 numbers of from "00000" to "00999" are for real PlayLists, and 200 numbers of from "01000" to "01199" are for the virtual PlayLists. The extension of each file is ".mpls."

The directory CLIPINF 850 has a database of clips. The directory CLIPINF 850 contains files 851 through 853 as clip information files respectively corresponding to clip AV stream files. The file name of each file in the directory CLIPINF 850 contains a five-digit number and an extension. The extension of each file is ".clpi."

The directory STREAM 860 stores an AV stream file as a body. The directory STREAM 860 stores clip information files 861 through 863 respectively corresponding to clip information files. Each file in the directory STREAM 860 is an MPEG-2 transport stream. The file name of each file contains a five-digit number and an extension. The five-digit number portion of the file name is set to be the same as the corresponding clip information file, thereby indicating the correspondence between the clip information file and the clip AV stream file. The extension of each file is ".m2ts."

The directory BACKUP 870 stores the backup of the above-described directories and files.

The directory AVCHDTN 880 stores two types of thumbnail files "thumbnail.tidx" 881 and "thumbnail.tdt2" 882. The thumbnail file thumbnail.tidx 881 stores index information indexing the each image data. The thumbnail file thumbnail.tdt2 882 is a set of thumbnail image data.

FIG. 6 generally illustrates a data structure of a modified digital video pack (MDP) in accordance with the AVCHD standard. The data structure shown in FIG. 6 is a syntax based on the C programming language description method.

The MDP is stored as user data in an elementary stream (ES) of video data. A field "uuid_iso_iec__11578" in the user data has a data length of 128 bits, and a universally unique identifier defined in "ISO/IEC 11578" standard represents an identifier of the user data.

A field "type_indicator" has a data length of 32 bits, and indicates the data type of the user data. If the data type is "0x4741 3934" (hereinafter 0x means that the number in succession thereto is a hexadecimal number), the user data is subtitle data (cc_data) of a closed caption (CC), and if the data type is "0x4D44 504D," the user data is metadata of MDP (ModifiedDVPackMeta).

The MDP metadata contains any number of entries of MDP (one_modified_dv_pack), each entry being 40 bits long. The number of entries is stored in an 8-bit long field "number_of_modified_dv_pack_entries." One MDP contains an 8-bit long field "mdp_id" indicating ID of MDP, and a 32-bit long field "mdp_data" indicating the MDP data.

FIG. 7 illustrates the correspondence between the ID of the MDP and the additional information in the AVCHD standard. As shown in FIG. 7, the additional information of the MDP contains information regarding the image recording time and date, information regarding image capturing conditions such as exposure time and F-number, information regarding the global positioning system (GPS), and information regarding camera.

MDP IDs 0x18 and 0x19 represent image recording time and date. The following discussion is based on this image recording time and date.

FIGS. 8A and 8B illustrate a data structure of the MDP indicating the recording time and date in accordance with the AVCHD standard. As previously described with reference to FIG. 6, each MDP permits only a data length of 32 bits to be stored, and the recording time and date is stored in two MDPs. FIG. 8A illustrates "REC TIME & DATE 1" and the ID of this MDP is 0x18 as previously discussed with reference to FIG. 7. FIG. 8B illustrates "REC TIME & DATE 2" and the ID of this MDP is 0x19 as previously discussed with reference to FIG. 7.

The data of the MDP contains an 8-bit long block "blkTimeZone" and a 24-bit long field "RecordTimeAndDate1_of__2" or a 32-bit long field "RecordTimeAndDate2_of__2". The recording time and date are represented by data of 56 bits long composed of the 24-bit long field "RecordTimeAndDate1_of__2" and the 32-bit long field "RecordTimeAndDate2_of__2". More specifically, the recording time and date are represented by a total of 14 digits, namely, the year (4 digits), the month (2 digits), the day (2 digits), the hour (2 digits), the minute (2 digits), and the second (2 digits), each represented in 4 bits binary coded decimal (BCD).

FIG. 9 illustrates a data structure of a time zone in accordance with the AVCHD standard. A block "blkTimeZone" in the MDP data discussed with reference to FIG. 8 includes a padding bit, a 1-bit long field "DaylightSavingTimeFlag" indicating whether the daylight saving time is applied, a 1-bit long field "TimeZoneSign" indicating the sign of a time-zone difference, a 4-bit long field "TimeZoneValue" indicating the value of the time-zone difference (by hour), and a 1-bit long field "HalfHourFlag" indicating the value of the time-zone difference (by half hour). More specifically, the block "blkTimeZone" indicates the time-zone difference with respect to the Greenwich Mean Time (GMT).

In accordance with the AVCHD standard, the additional information including the recording time and date is retrieved as the additional information in the first recording format using the MDP. The additional information thus retrieved is recorded as a text subtitle of the BD as described below.

FIGS. 10A-10C illustrate a stream file 510 containing a text subtitle in accordance with the BD standard. As shown in FIG. 10A, the stream file 510 containing the text subtitle is handled as a transport stream composed of a plurality of transport packets (TP511 as shown) during transmission. A packet identifier (PID) of the transport packet is "0x1800."

During recording or playing, the stream file 510 is converted into a stream having the unit of packetized elementary stream (PES) packet 521 as shown in FIG. 10B. As shown in FIG. 10C, a leading PES packet of the plurality of PES packets forming the stream file containing the text subtitle is attribute data referred to as a dialog style segment 531. The PES packet in succession to the leading PES packet is a character object referred to as a dialog presentation segment 532. More specifically, the dialog presentation segment 532 stores the character object (text data) such as the recording time and date, and the dialog style segment 531 stores the attribute data such as a font size and a line space.

FIG. 11 illustrates a data structure of a text subtitle stream defined in the BD standard. As previously discussed, the text subtitle stream contains one dialog style segment 531 and any number of dialog presentation segments 532. In the text subtitle stream, the dialog style segment 531 is followed by the number of dialog presentation segments 532 defined in a 16-bit long field "number_of_dialog_presentation_segements."

FIGS. 12A and 12B illustrate a data structure of the segment in accordance with the BD standard. This data structure is identical to both the dialog style segment 531 and the dialog presentation segment 532. FIG. 12A generally illustrates the segment. A field "segment_descriptor" within the segment contains an 8-bit long field "segment_type" and a 16-bit long field "segment_length" as shown in FIG. 12B.

The field "segment_type" represents the type of this segment. If the segment is the dialog style segment 531, the field "segment_type" stores "0x81" and if the segment is the dialog presentation segment 532, the field "segment_type" stores "0x82." The field "segment_length" indicates the number of bytes of this segment.

Data responsive to the type of the segment is stored in a field "segment_data" of FIG. 12A. Text data to be displayed is stored in the case of the dialog presentation segment 532, and a dialog style set indicating the attribute data is stored in the case of the dialog style segment 531.

FIG. 13 illustrates a data structure of the dialog style set in accordance with the BD standard.

A leading one-bit long field "player_style_flag" specifies whether a modification to a user's own style is permitted or not.

A next 15-bit long reserved area is followed by an 8-bit long field "number_of_region_styles" indicating the number of region styles. The term region means a display area, and the term region style means a style of display area. The region style is defined by "region_style" in the dialog style set.

A subsequent 8-bit long field "number_of_user_styles" indicates the number of user styles. The user style refers to the user's own style to which the above-described style in the display area is modified by the user. The user style is defined in "user_changeable_style_set" in the dialog style set.

As shown in FIG. 13, a field "region_style" defines information regarding the region (position, width, height, background color, etc.), information regarding the text box in the region (position, width, height, etc.), and information regarding the font (size, style, etc.).

A field "user_changeable_style_set" specifies an amount of modification to each item (not shown) defined by the field "region_style."

In accordance with one embodiment of the present invention, the display style specified by the display style specifier 329 is reflected in the field "region_style" or the field "user_changeable_style_set" when the additional information in the first recording format is converted by the additional information converter 322. The display style of the additional information in the second recording format is thus determined.

Figure 14:
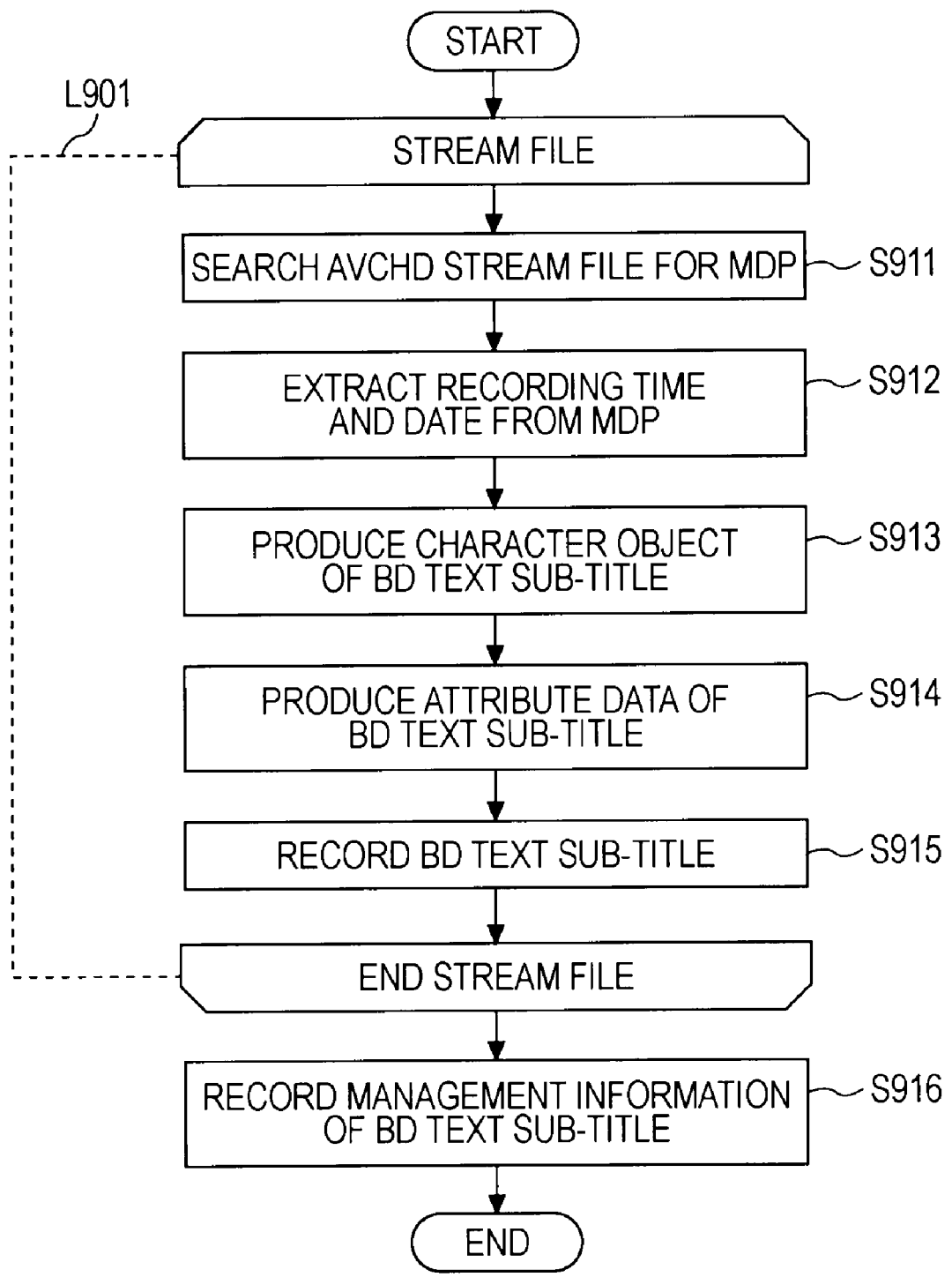
FIG. 14 illustrates a process performed by the information converting apparatus in the first configuration thereof in accordance with one embodiment of the present invention.

FIG. 14 illustrates a process of the information converting apparatus 300 in the first configuration thereof in accordance with one embodiment of the present invention.

The MDP of the above-described user data is searched in the AVCHD stream file in the first recording format (step S911). The recording time and date are extracted from the fields "REC TIME & DATE 1" and "REC TIME & DATE 2" of the hit MDP (step S912).

In response to the extracted recording time and date, the character object (text data) is generated to match the dialog presentation segment 532 in the BD text subtitle in the second recording format as a conversion destination (step S913).

In response to the display style specified by the display style specifier 329, the attribute data is generated to match the dialog style segment 531 in the BD text subtitle (step S914). For example, the attribute data generated and set contains a font type, a font size, a font style, a position, a display start time, a display end time, a character color, a background color, transparency, etc.

The character object and the attribute data, thus generated, are recorded as a BD text subtitle stream (step S915).

These steps are iterated (loop L901) until processing of the AVCHD stream file as a conversion source is completed. Management information of the text subtitle in a BD management file is recorded (step S916). The conversion process is then completed. The BD management file is managed under the same environment as the data structure of the AVCHD discussed with reference to FIG. 3. More specifically, the clip information file (management file) managing the stream file containing the text subtitle is defined. The entire BD is managed when the play list file references the clip information file.

In the above example, the MDP is stored in the additional information storage unit 382 in the first recording format and the recording time and date are extracted from the MDP. The retrieval source of the recording time and date is not limited to the MDP. The recording time and date attached to a chapter mark of the play list may be retrieved as described below. Alternatively, the recording time and date may be retrieved from the file system of the stream file of the audio-visual data.

FIG. 15 illustrates a data structure of the playlist file in accordance with the AVCHD standard. In the playlist file, a field "TypeIndicator," having a data length of 32 bits (8 bits×4 bytes), is an identifier indicating that this file is a playlist file. A field "TypeIndicator2," having a data length of 32 bits, stores a fixed value.

The playlist contains a block "blkAppInfoPlayList( )," a block "blkPlayList( )," a block "blkPlayListMark( )," and a block "blkExtensionData( )." A field "PlayListStartAddress," a field "PlayListMarkStartAddress," and a field "ExtensionDataStartAddress," each having a data length of 32 bits, respectively show start addresses of the block "blkPlayList( )," the block "blkPlayListMark( )," and the block "blkExtensionData( )".

The block "blkAppInfoPlayList( )" starts subsequent to a field "reserved" having a data length of 160 bits that follows the above-described start addresses. The block "blkAppInfoPlayList( )" contains information relating to the type and play order of the playlist described in a next block "blkPlayList( )." The block "blkPlayList( )" describes the playlist. The block "blkPlayListMark" describes as a chapter mark a point of jump destination in chapter jumping. The block "blkExtensionData( )" stores extension data related to the playlist.

FIG. 16 illustrates a data structure of a block "blkPlayListMarkExt( )" in accordance with the AVCHD standard. The block "blkPlayListMarkExt( )" is contained in the block "blkExtensionData( )" of the playlist discussed with reference to FIG. 15 and stores extension data related to the chapter mark.

The block "blkPlayListMarkExt( )" contains a field "Length" indicating the data length, a field "NumberOfPlayListMarks" indicating the number of chapter marks, and further a block "blkMarkExtension" for each chapter mark.

The block "blkMarkExtension" stores a block "blkTimeZone" discussed with reference to FIG. 9 and the recording time and date "RecordTimeAndDate" in 14 BCD digits described with reference to FIGS. 8A and 8B. These pieces of information are thus retrieved as the recording time and date in the first recording format to be processed by the additional information converter 322.

In the above discussion, the additional information storage unit 392 for the second recording format is based on the BD text subtitle and the recording time and date is converted into the text subtitle. However, the conversion destination of the recording time and date is not limited to the text subtitle. For example, the recording time and date may be converted into a bitmap such as BD presentation graphics or a DVD subpicture unit. Furthermore, the recording time and date may be re-encoded with the character thereof superimposed on the video.

In the above example, the additional information is converted between different formats. The same process may be performed within the same format. In the discussion that follows, the additional information is converted within the same format.

Figure 17:
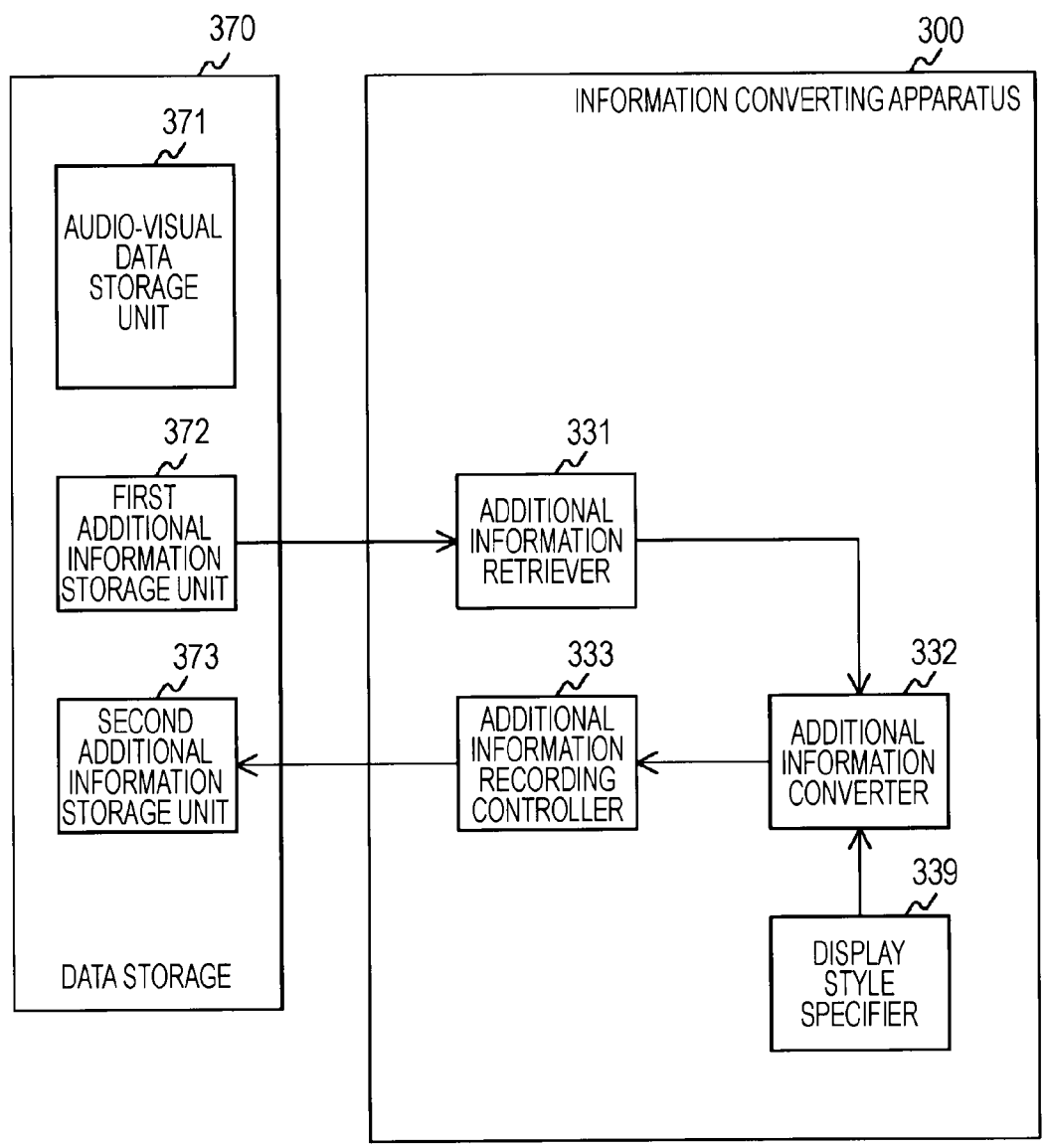
FIG. 17 illustrates an information converting apparatus in a second configuration thereof in accordance with one embodiment of the present invention.

FIG. 17 illustrates the information converting apparatus 300 in a second configuration thereof in accordance with one embodiment of the present invention. The information converting apparatus 300 in the second configuration thereof converts the additional information stored on a first additional information storage unit 372 in a data storage 370 and records the converted additional information onto a second additional information storage unit 373.

The data storage 370 includes an audio-visual data storage unit 371 storing the audio-visual data, and further the first additional information storage unit 372 and the second additional information storage unit 373, each storing the additional information. In this example, the first additional information storage unit 372 and the second additional information storage unit 373 are arranged in the data storage 370. Given the same format, however, the first additional information storage unit 372 and the second additional information storage unit 373 may be arranged in different recording media. For example, data in the AVCHD standard on a semiconductor recording medium may be dubbed onto an optical disk-like recording medium as data in the AVCHD standard. In such a case, the information converting apparatus 300 in the second configuration may be used.

The information converting apparatus 300 in the second configuration thereof includes an additional information retriever 331, an additional information converter 332, an additional information recording controller 333, and a display style specifier 339.

The additional information retriever 331 retrieves the additional information from the first additional information storage unit 372. The retrieved additional information is then supplied to the additional information converter 332.

The additional information converter 332 converts the additional information supplied from the additional information retriever 331 from a first additional information form to a second additional information form. The converted additional information is then supplied to the additional information recording controller 333.

The additional information recording controller 333 controls recording of the additional information supplied from the additional information converter 332 onto the second additional information storage unit 373. In this way, the second additional information storage unit 373 records the additional information in a form different from the additional information stored on the first additional information storage unit 372.

The display style specifier 339 specifies the display style of the additional information to be recorded onto the second additional information storage unit 373. The additional information converter 332 converts the additional information in accordance with the display style specified by the display style specifier 339. As the display style specifier 329, the display style specifier 339 may be a unit that stores fixed data onto a random-access memory (ROM) or the like, or may be a user interface that receives a user operation input.

The information converting apparatus 300 in the second configuration thereof converts the additional information stored on the MDP complying with the AVCHD standard into an overlay bit map in accordance with the AVCHD standard and then stores the resulting overlay bit map. The MDP has been discussed with reference to FIGS. 6 through 9. The overlay bit map of the AVCHD standard is described below.

FIGS. 18A and 18B illustrate a data structure of a bitmap unit contained in the overlay bit map of the AVCHD standard. FIG. 18A illustrates the data structure of the entire bit map, and a field "UnitDescriptor( )" within the bit map contains an 8-bit long field "UnitType" and a 16-bit long field "UnitLength" as shown in FIG. 18B.

The field "UnitType" indicates the type of the bitmap unit, and data of this type is stored in a field "UnitData( )" of the bit map. The field "UnitLength" indicates the number of bytes of the bitmap unit.

FIG. 19 illustrates the type of the bitmap unit of the AVCHD standard. If the field "UnitType" of FIG. 18B contains "0x14," "Palette Unit" is stored on the field "UnitData( )." The "Palette Unit" contains a color of each pixel, a transparency information table, etc.

If the field "UnitType" contains "0x15," "Object Unit" is stored on the field "UnitData( )." The "Object Unit" contains a bitmap data body, position and size information thereof, etc.

If the field "UnitType" contains "0x16," "Overlay BitMap Compilation" is stored on the field "UnitData( )." The "Overlay Bitmap Compilation" contains the type of display information regarding the overlay bitmap, additional information regarding an object and a window, and other information.

If the field "UnitType" contains "0x17," "Window Unit" is stored on the field "UnitData( )." The "Window Unit" contains information regarding a display period within a window, and other information.

If the field "UnitType" contains "0x18," "Menu Bitmap Compilation Unit" is stored on the field "UnitData( )." The "Menu Bitmap Compilation Unit" contains information regarding the type of display information regarding a menu bitmap, information regarding the object and the window, and other information.

If the field "UnitType" contains "0x80," "End Unit" is stored on the field "UnitData( )." The "End Unit" contains ending information of a unit of displaying.

FIGS. 20A and 20B illustrate a data structure of the "Object Unit" of the AVCHD standard. If the field "UnitType" contains "0x15," the "Object Unit" is stored on the field "UnitData( )" of the bitmap unit.

As shown in FIG. 20A, the "Object Unit" contains a 24-bit long field "UnitDescriptor( )," a 16-bit long field "ObjectID", an 8-bit long field "ObjectVersionNumber," a field "SequenceDescriptor," and a field "ObjectData( )."

As shown in FIG. 20B, the "ObjectData( )" stores a 24-bit long field "ObjectDataLength" indicating a data length of an object, a 16-bit long field "ObjectWidth" indicating a width of the object, a 16-bit long field "ObjectHeight" indicating a height of the object, and a field "RunLengthEncodedLine( )" indicating runlength coded bitmap data.

In accordance with the AVCHD standard, the runlength coded bitmap data is stored in the "Object Unit" of the bitmap unit contained in the overlay bit map. Also, in accordance with the AVCHD standard, management information is stored as described below. A block "blkSTNTable( )" and a block "blkStreamCodingInfo( )" are described as examples of the management information. The block "blkSTNTable( )" is defined in the playlist file and the block "blkStreamCoding-Info( )" is defined in the clip information file.

FIG. 21 illustrates a data structure of the block "blkPlayItem( )" of the AVCHD standard. The block "blkPlayItem( )" is contained in the playlist discussed with reference to FIGS. 3 and 15.

A 16-bit long field "Length" indicates the entire data length of the block "blkPlayItem" to the end thereof.

A 40-bit (8 bits×5 bytes) long field "ClipInformationFileName" stores a file name of a clip information file referenced by the block "blkPlayItem." A 32-bit (8 bits×4 bytes) long field "ClipCodecIdentifier" stores fixed data.

A 4-bit long field "ConnectionCondition" following a 12-bit long preserved area indicates information relating to connection state between clips (seamless connection).

An 8-bit long field "RefToSTCID" indicates which of system time clocks (STC) of the corresponding clip file is referenced. A 32-bit long field "InTime" and a 32-bit long field "OutTime" respectively indicate a start point (IN point) and an end point (OUT point) of a play range of a main clip AV stream in the STC specified by the field "RefToSTCID."

A block "blkUOMaskTable( )" is a table listing a reception limit to user input. A 1-bit long field "PlayItemRandomAccessFlag" determines whether to permit a playitem of the "blkPlayItem" to be randomly accessed.

A 8-bit long field "StillMode," following a 7-bit long reserved area, indicates whether to display as a still image an image displayed last in the playitem of the "blkPlayItem." If the field "StillMode" contains "0x01," a 16-bit long field "StillTime" indicates a still image time.

On a per stream number (STN) basis, a block "blkSTNTable( )" manages attributes of each type of streams managed by the playitem of the block "blkPlayItem," a PID number, and a recoding position on a recording medium. The block "blkSTNTable( )" is described below.

FIG. 22 illustrates a display style of the block "blkSTNTable( )" of the AVCHD standard.

A 16-bit long field "Length" has the entire data length of the block "blkSTNTable( )" to the end thereof.

The block "blkSTNTable( )" contains a 17-bit long reserved field, an 8-bit long field "NumberOfVideoStreamEntries," an 8-bit long field "NumberOfAudioStreamEntries," an 8-bit long field "NumberOfOBStreamEntries," and an 8-bit long field "NumberOfMBStreamEntries." The field "NumberOfVideoStreamEntries," the field "NumberOfAudioStreamEntries," the field "NumberOfOBStreamEntries," and the field "NumberOfMBStreamEntries" respectively store the numbers of entries of a video stream, an audio stream, an overlay bitmap stream, and a menu bit stream. In accordance with one embodiment of the present invention, the overlay bitmap is handled, and the discussion of the other streams is omitted herein.

The overlay bitmap stream is defined by a block "blkStreamEntry( )" and a block "blkStreamAttributes( )". The block "blkStreamEntry( )" stores an entry for referencing the overlay bitmap stream. The block "blkStreamAttributes" stores attributes of the overlay bitmap stream.

FIG. 23 illustrates a data structure of the block "blkStreamEntry( )" of the AVCHD standard.

A 16-bit long field "Length" indicates the entire length of the block "blkStreamEntry( )" to the end thereof. A 16-bit long field "Type" indicates a stream type. A stream type of "1" indicates a main clip, and a stream type of "2" indicates a sub path.

A 16-bit long field "RefToStreamPIDOfMainClip" stores a PID of the main clip. The main clip of the overlay bitmap stream is referenced by this PID.

Since the sub path is not used in the overlay bitmap stream, the remaining fields are not discussed herein.

FIG. 24 illustrates a data structure of the block "blkStreamAttributes( )" of the AVCHD standard.

A 16-bit long field "Length" indicates the entire length of the block "blkStreamAttributes( )" to the end thereof. A 16-bit long field "StreamCodingType" indicates the type of stream encoding. If the field "StreamCodingType" contains "0x1B," the corresponding elementary stream is a video stream. If the field "StreamCodingType" contains "0x80," the corresponding elementary stream is an audio stream that is encoded through linear pulse code modulation (LPCM). If the field "StreamCodingType" contains "0x81," the corresponding elementary stream is an audio stream encoded through AC-3. If the field "StreamCodingType" contains "0x90," the corresponding elementary stream is an overlay bitmap stream. If the field "StreamCodingType" contains "0x91," the corresponding elementary stream is a menu bitmap stream. The overlay bitmap stream with the field "StreamCodingType" being "0x90" is described below.

A 24-bit (8 bits×3 bytes) long field "OBLanguageCode" indicates a language code of the overlay bitmap stream. By referencing this field, the overlay bitmap stream of an intended language is selected.

FIG. 25 illustrates a data structure of the clip information file of the AVCHD standard.

A field "TypeIndicator" in the clip information file, having a data length of 32 bits (8 bits×4 bytes), is an identifier indicating that the file type of this file is a clip information file. The field "TypeIndicator2" having a data length of 32 bits stores a fixed value.

The clip information file contains a block "blkClipInfo( )," a block "blkSequenceInfo( )," a block "blkProgramInfo( )," a block "blkCPI( )," a block "blkClipMark( )," and a block "blkExtensionData( )." The start addresses of the block "blkSequenceInfo( )," the block "blkProgramInfo( )," the block "blkCPI( )," the block "blkClipMark( )," and the block "blkExtensionData( )" are respectively represented by a field "SequenceInfoStartAddress," a field "ProgramInfoStartAddress," a field "CPIStartAddress," a field "ClipMarkStartAddress," and a field "ExtensionDataStartAddress," each field having a data length of 32 bits.

The field "ExtensionDataStartAddress" represents the start address of the block "blkExtensionData( )" by the relative number of bytes from the head of the clip information file. The relative number of bytes starts with "zero." If the field "ExtensionDataStartAddress" is "zero," there is no block "blkExtensionData" within the clip information file.

These fields indicating the start addresses are followed by a "reserved" area having a data length of 96 bits. The block "blkClipInfo( )" follows the reserved area. The block "blkClipInfo( )" contains information related to the clip AV stream managed by the clip information file. The data structure of the block "blkClipInfo( )" will be described later.

The block "SequenceInfo( )" contains information that is used to manage a sequence of a system time clock (STC) and an arrival time clock (ATC).

The block "blkProgramInfo( )" contains information related to an encoding method of the clip AV stream managed by the clip information file and an aspect ratio of video data in the clip AV stream.

The block "blkCPI( )" contains information related to a mapping table mapping a time position of the stream file to a space position of the stream file. No significant information is contained in the block "blkClipMark( )."

The block "blkExtensionData( )" permits extension data to be stored therewithin.

FIG. 26 illustrates a data structure of the block "blkStreamCodingInfo( )" of the AVCHD standard. The block "blkStreamCodingInfo( )" is contained in the block "blkProgramInfo( )" of the clip information file.

A 8-bit long field "Length" indicates a data length extending from the end of the field "Length" to the end of the block "blkStreamCodingInfo( )." A 16-bit long field "StreamCodingType" indicates the type of stream encoding and identical to the one discussed with reference to FIG. 24. The overlay bitmap stream with the field "StreamCodingType" being "0x90" is described below.

A 24-bit (8 bits×3 bytes) long filed "OBLanguageCode" indicates a language code of the overlay bitmap stream. By referencing this field, the overlay bitmap stream of an intended language is selected.

Figure 27:
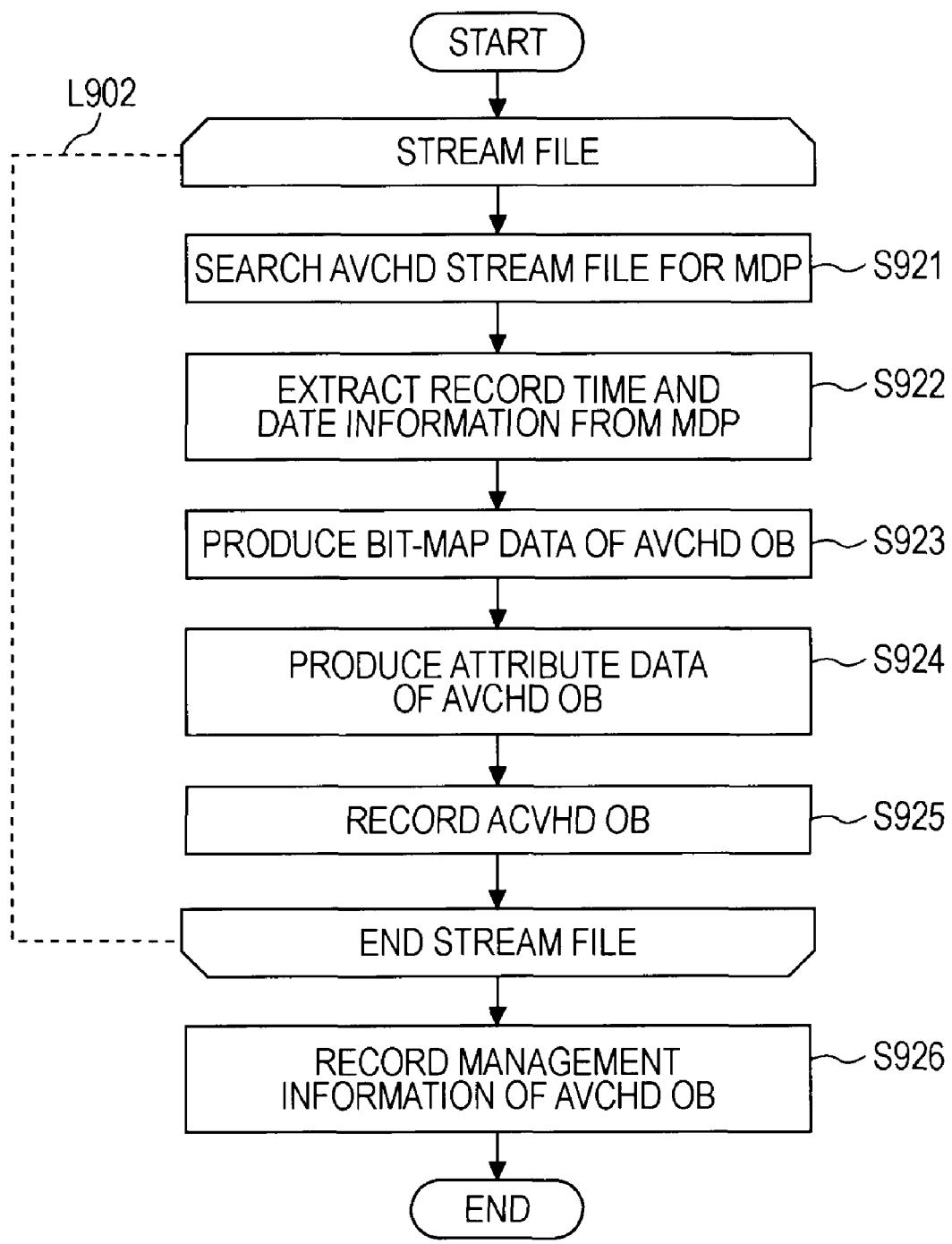
FIG. 27 illustrates a process performed by the information converting apparatus in the second configuration thereof in accordance with one embodiment of the present invention.

FIG. 27 illustrates a process to be performed by the information converting apparatus 300 in the second configuration thereof in accordance with one embodiment of the present invention.

The MDP of the above-described user data is searched in the AVCHD stream file as a conversion source (step S921). The recording time and date are extracted from the fields "REC TIME & DATE 1" and "REC TIME & DATE 2" of the hit MDP (step S922).

In response to the extracted recording time and date, the bitmap data is generated to match the overlay bitmap stream as a conversion destination in accordance with the display style specified by the display style specifier 329 (step S923). For example, a font type, a font size, a font style, etc. are thus specified.

In response to the display style specified by the display style specifier 329, the attribute data of the overlay bitmap stream is generated to match the dialog style segment 531 in the BD text subtitle (step S924). For example, the attribute data generated and set contains a position, a display start time, a display end time, a character color, a background color, transparency, etc.

The bitmap data and the attribute data, thus generated, are multiplexed with the overlay bitmap stream of the AVCHD, moving image and audio, and then resulting data is recorded (step S925).

These steps are iterated (loop L902) until processing of the AVCHD stream file as a conversion source is completed. Management information of the overlay bitmap stream of the AVCHD is recorded (step S926). The conversion process is then completed. The management information of the overlay bitmap stream may include the above-described blocks "blkSTNTable( )" and "blkStreamCodingInfo( )."

In the above example, the first additional information storage unit 372 stores the MDP of the attribute data and the recording time and date is extracted from the MDP. The retrieval source of the recording time and date is not limited to the MDP. The recording time and date attached to a chapter mark of the play list may be retrieved as previously discussed with reference to FIGS. 15 and 16. Alternatively, the recording time and date may be retrieved from the file system of the stream file of the audio-visual data.

In the above example, the second additional information storage unit 373 handles the overlay bitmap stream of the AVCHD and the recording time and date is converted into the overlay bitmap stream. The conversion destination of the recording time and date is not limited to the overlay bitmap stream. For example, the recording time and date may be encoded with the character superimposed on the video.

In accordance with one embodiment of the present invention, one of the additional information converters 322 and 332 converts the additional information, retrieved by one of the additional information retrievers 321 and 331, in accordance with the display style specified by one of the display style specifiers 329 and 339. The additional information, the displaying of which is not necessary by the standard, is displayed on another reproducing apparatus.

The embodiments of the present invention have been discussed for exemplary purposes only, and the correspondence between elements in the embodiments and corresponding elements in claims is described below. The present invention is not limited to the correspondence, and a variety of changes is possible to the correspondence within the scope of the present invention.

The additional information retrieval means corresponds to one of the additional information retrievers 321 and 331, for example. The additional information converting means corresponds to one of the additional information converters 322 and 332, for example. The additional information recording control means corresponds to one of the additional information recording controllers 323 and 333, for example.

The display style specifying means corresponds to one of the display style specifiers 329 and 339, for example.

The additional information retrieval means corresponds to the additional information retriever 331, for example. The additional information converting means corresponds to the additional information converter 332, for example. The additional information recording control means corresponds to the additional information recording controller 333, for example.

The step of retrieving the additional information corresponds to one of steps S912 and S922, for example. The step of converting the retrieved additional information corresponds to one of steps S913 and S914 or steps S921 and S924, for example. The step of controlling recording of the converted additional information corresponds to one of steps S915 and S925, for example.

The method steps described in the above embodiments may be considered as a method, as a program for causing a computer to perform the method, or as a recording medium storing the program.

It should be understood by those skilled in the art that various modifications, combinations, sub-combinations and alterations may occur depending on design requirements and other factors insofar as they are within the scope of the appended claims or the equivalents thereof.

What is claimed is:

1. An information converting apparatus, comprising:
additional information retrieval means for retrieving additional information incidental to moving image data stored on a stream file having a first recording format corresponding to the AVCHD standard;
additional information converting means for converting the retrieved additional information in accordance with a second recording format corresponding to one of the digital versatile disk standard and the Blu-ray disk standard, and, in response to the second recording format corresponding to the Blu-ray disk standard, converting the retrieved additional information into a second segment of one of a plurality of packetized elementary stream packets of a Blu-ray disk standard stream file, the second segment following a first segment that defines a display style of the additional information, the second segment being of another of the plurality of packetized elementary stream packets of the Blu-ray disk standard stream file; and additional information recording control means for controlling recording of the converted additional information onto a stream file having the second recording format.

2. The information converting apparatus according to claim 1, wherein the additional information includes image recording time and date of the moving image data.

3. The information converting apparatus according to claim 1, wherein the additional information in the first recording format includes data having no display style.

4. The information converting apparatus according to claim 1, further comprising display style specifying means for specifying the display style of the additional information in the second recording format.

5. The information converting apparatus according to claim 3, wherein the additional information in the first recording format includes information that is recorded as a modified digital video pack defined by the AVCHD standard.

6. The information converting apparatus according to claim 4, wherein the additional information in the second recording format includes text data arranged in the display style specified by the display style specifying means.

7. The information converting apparatus according to claim 4, wherein the additional information in the second recording format includes bitmap data arranged in the display style specified by the display style specifying means.

8. The information converting apparatus according to claim 6, wherein the additional information in the second recording format includes information recorded as a text subtitle in accordance with the Blu-ray disk standard.

9. An information converting apparatus, comprising:
additional information retrieval means for retrieving first additional information of moving image data recorded on a stream file, the first additional information including information recorded as a modified digital video pack defined by the AVCHD standard;
additional information converting means for converting the retrieved first additional information into second additional information; and
additional information recording control means for controlling recording of the converted second additional information in the same recording format as the stream file,
wherein the second additional information includes information recorded as an overlay bitmap defined by the AVCHD standard.

10. The information converting apparatus according to claim 9, further comprising display style specifying means for specifying a display style of the second additional information.

11. The information converting apparatus according to claim 10, wherein the first additional information includes data having no display style, and wherein the second additional information includes bitmap data arranged in the display style specified by the display style specifying means.

12. An information converting method that is performed in an information converting apparatus that includes a processor, the information converting method comprising steps of:
retrieving additional information incidental to moving image data stored on a stream file having a first recording format corresponding to the AVCHD standard;
converting, using the processor of the information converting apparatus, the retrieved additional information in accordance with a second recording format corresponding to one of the digital versatile disk standard and the Blu-ray disk standard, and, in response to the second recording format corresponding to the Blu-ray disk standard, converting the retrieved additional information into a second segment of one of a plurality of packetized elementary stream packets of a Blu-ray disk standard stream file, the second segment following a first segment that defines a display style of the additional information, the second segment being of another of the plurality of packetized elementary stream packets of the Blu-ray disk standard stream file; and
controlling recording of the converted additional information onto a stream file having the second recording format.

13. A non-transitory computer-readable storage medium including computer executable instructions, wherein the instructions, when executed by a computer, cause the computer to perform a method, the method comprising execute steps of :
retrieving additional information incidental to moving image data stored on a stream file having a first recording format corresponding to the AVCHD standard;
converting the retrieved additional information in accordance with a second recording format corresponding to one of the digital versatile disk standard and the Blu-ray disk standard, and, in response to the second recording format corresponding to the Blu-ray disk standard, converting the retrieved additional information into a second segment of one of a plurality of packetized elementary stream packets of a Blu-ray disk standard stream file, the second segment following a first segment that defines a display style of the additional information, the second segment being of another of the plurality of packetized elementary stream packets of the Blu-ray disk standard stream file; and
controlling recording of the converted additional information onto a stream file having the second recording format.

14. An information converting apparatus, comprising: an additional information retrieval unit configured to retrieve additional information incidental to moving image data stored on a stream file having a first recording format corresponding to the AVCHD standard;
an additional information converting unit configured to convert the retrieved additional information in accordance with a second recording format corresponding to one of the digital versatile disk standard and the Blu-ray disk standard, and, in response to the second recording format corresponding to the Blu-ray disk standard, converting the retrieved additional information into a second segment of one of a plurality of packetized elementary stream packets of a Blu-ray disk standard stream file, the second segment following a first segment that defines a display style of the additional information, the second segment being of another of the plurality of packetized elementary stream packets of the Blu-ray disk standard stream file; and an additional information recording control unit configured to control recording of the converted additional information onto a stream file having the second recording format.

15. An information converting apparatus, comprising:

an additional information retrieval unit configured to retrieve first additional information of moving image data recorded on a stream file, the first additional information including information recorded as a modified digital video pack defined by the AVCHD standard;

an additional information converting unit configured to convert the retrieved first additional information into second additional information; and an additional information recording control unit configured to control recording of the converted second additional information in the same format as the stream file, wherein the second additional information includes information recorded as an overlay bitmap defined by the AVCHD standard.

* * * * *